(12) United States Patent
Biller

(10) Patent No.: US 8,051,115 B2
(45) Date of Patent: Nov. 1, 2011

(54) MEASURING FRAGMENTATION ON DIRECT ACCESS STORAGE DEVICES AND DEFRAGMENTATION THEREOF

(76) Inventor: Koby Biller, Rehovot (IL)

( * ) Notice: Subject to any disclaimer, the term of this patent is extended or adjusted under 35 U.S.C. 154(b) by 798 days.

(21) Appl. No.: 11/574,813

(22) PCT Filed: Aug. 4, 2005

(86) PCT No.: PCT/IL2005/000834
§ 371 (c)(1),
(2), (4) Date: Mar. 7, 2007

(87) PCT Pub. No.: WO2006/027771
PCT Pub. Date: Mar. 16, 2006

(65) Prior Publication Data
US 2009/0055450 A1 Feb. 26, 2009

Related U.S. Application Data

(60) Provisional application No. 60/607,595, filed on Sep. 8, 2004.

(51) Int. Cl.
*G06F 17/00* (2006.01)
(52) U.S. Cl. .......... 707/823; 711/162; 711/170
(58) Field of Classification Search ........... 707/823; 711/162, 170
See application file for complete search history.

(56) References Cited

U.S. PATENT DOCUMENTS

| | | | |
|---|---|---|---|
| 6,505,217 B1 * | 1/2003 | Venkatraman et al. | 1/1 |
| 2002/0128994 A1 * | 9/2002 | Sadhasivan et al. | 707/1 |
| 2002/0133683 A1 * | 9/2002 | Jochemsen et al. | 711/170 |
| 2006/0294059 A1 | 12/2006 | Chamberlain et al. | |

* cited by examiner

*Primary Examiner* — Belix M Ortiz
(74) *Attorney, Agent, or Firm* — AlphaPatent Assciates Ltd.; Daniel J. Swirsky

(57) ABSTRACT

A method for determining file fragmentation and performing subsequent defragmentation, including measuring a file fragmentation factor, measuring a file extent distance factor, measuring a file fragmentation level, selecting a file stored as multiple extents on at least one disk, selecting a free space extent on the disk whose length most closely matches the length of the file, calculating a fragmentation level of the disk from a fragmentation factor and a file extent distance factor of free space extents or allocated space extents of the disk, calculating the effect that moving the file to the free space extent would have on the fragmentation level, and moving the file to the free space extent provided that doing so causes the fragmentation level to satisfy a criterion.

18 Claims, 10 Drawing Sheets

MEASURING FRAGMENTATION ON DIRECT ACCESS STORAGE DEVICES AND DEFRAGMENTATION THEREOF

CROSS-REFERENCE TO RELATED APPLICATIONS

This application is a U.S. National Phase Application under 35 U.S.C. 371 of PCT International Application No. PCT/IL2005/000834, which has an international filing date of Aug. 4, 2005, and which claims priority from U.S. Provisional Patent Application No. 60/607,595, filed Sep. 8, 2004, both of which are incorporated herein by reference in their entirety.

FIELD OF THE INVENTION

The present invention relates to Direct Access Storage Devices in general, and in particular to measuring fragmentation thereof in support of defragmentation.

BACKGROUND OF THE INVENTION

As files are created and deleted on a Direct Access Storage Device, hereinafter referred to as a "disk," the files and the free space on the disk typically become fragmented. Fragmentation occurs when an individual file is not stored to a contiguous region of the disk, but rather is broken up into two or more pieces, or "extents," which are stored to separate regions of the disk. When a program tries to access a fragmented file, the disk read/write head must often move between multiple disk regions in order to access each extent of the file. As more files become fragmented, and as individual files are fragmented into more and more extents, more read/write head movements are required for file access, resulting in reduced performance.

Defragmentation may be employed to increase the amount of contiguous free space on the disk and reduce the number of file extents, thereby reducing head movement and file access time. In one common method for defragmenting a disk, all of the files on a disk are copied to another storage device. After the files are copied, they are then deleted from the disk. The files are then copied back onto the disk such that each file resides in contiguous regions of the disk space. This method is effective, but requires a second, spare storage device to be used as the intermediate storage medium.

In another method, file extents are moved to other disk regions to create a contiguous area of free space large enough to receive a single file. This process typically continues until all files are stored contiguously, with each file stored as a single extent, and with all free space being contiguous. While this method does not require a separate, intermediate storage medium, it is relatively slow due to the extensive data movement required.

When and how to defragment a disk often first depends on measuring the level of fragmentation of the disk. In one method, the level of fragmentation is expressed as a function of the number of free space fragments on the disk relative to the total free space. However, this method does not reflect qualitative measures of fragmentation. For example, while two files having the same number of extents may have the same quantitative measure of fragmentation, a qualitative fragmentation measure might reveal a significant difference between the two files, such as where the extents of one lie along the same disk track and on the same disk platter, or along the same cylinder on multiple disk platters, requiring little head movement, while the extents of the other lie in multiple disk tracks and cylinders on multiple disk platters, requiring greater head movement.

A qualitative fragmentation measure would therefore be advantageous, as would a defragmentation method that incorporates such a measure.

SUMMARY OF THE INVENTION

The present invention discloses an improved system and method for measuring fragmentation on direct access storage devices and for defragmentation thereof.

In one aspect of the present invention a method is provided for measuring a file fragmentation factor, the method including calculating the square of the length of a file stored on at least one disk, calculating the square of the length of each extent of the file, calculating the sun of the extent squares, and dividing the square of the file length by the sum of the extent squares.

In another aspect of the present invention the method further includes determining the length of the file as the sum of the lengths of each of the extents of the file.

In another aspect of the present invention the method further includes expressing the lengths in allocation units, where each track of the disk is divided into multiple allocation units, and where each of the extents occupies one or more contiguous allocation units.

In another aspect of the present invention the expressing step includes expressing where the allocation unit is a sector.

In another aspect of the present invention the method further includes performing any of the steps on a plurality of free space extents of the disk that are logically grouped together for use as the file.

In another aspect of the present invention the method further includes performing any of the steps on a plurality of allocated space extents of the disk that are logically grouped together for use as the file.

In another aspect of the present invention a method is provided for measuring a file extent distance factor, the method including traversing each of the extents of a file stored on at least one disk along a path from the first extent of the file to the last extent of the file where the order of the traversal follows the logical order of the extents in the file, calculating the distance from each of the extents to its succeeding extent, and calculating the sum of the distances.

In another aspect of the present invention the calculating distance step includes calculating a number of hops between disk platters where the extent and its succeeding extent lie in different disk platters.

In another aspect of the present invention the calculating distance step includes calculating a number of hops between cylinders where the extent and its succeeding extent lie in different cylinders.

In another aspect of the present invention the calculating distance step includes calculating a number of allocation units separating the extent and its succeeding extent, where the separation is calculated in the order in which the allocation units are normally read by a disk read/write head, and where the separation is calculated from a) the allocation unit in the track of the succeeding extent that corresponds positionally to the last allocation unit of the extent, to b) the first allocation unit of the succeeding extent.

In another aspect of the present invention the calculating distance step includes calculating a number of hops between disks where the extent and its succeeding extent lie in different disks.

In another aspect of the present invention the method further includes performing any of the steps on a plurality of free space extents of the disk that are logically grouped together for use as the file.

In another aspect of the present invention the method further includes performing any of the steps on a plurality of allocated space extents of the disk that are logically grouped together for use as the file.

In another aspect of the present invention a method is provided for measuring a file fragmentation level, the method including calculating the sum of a file's fragmentation factor and its extent distance factor, and dividing the sum by the file's length.

In another aspect of the present invention the dividing step includes dividing where the file's length is expressed in allocation units.

In another aspect of the present invention the method further includes weighting any of the factors using a predefined weight.

In another aspect of the present invention the method further includes performing any of the steps on a plurality of free space extents of the disk that are logically grouped together for use as the file.

In another aspect of the present invention the method further includes performing any of the steps on a plurality of allocated space extents of the disk that are logically grouped together for use as the file.

In another aspect of the present invention a method is provided for defragmentation, the method including selecting a file stored as multiple extents on at least one disk, selecting a free space extent on the disk whose length most closely matches the length of the file, calculating a fragmentation level of the disk from a fragmentation factor and a file extent distance factor of free space extents or allocated space extents of the disk, calculating the effect that moving the file to the free space extent would have on the fragmentation level, and moving the file to the free space extent provided that doing so causes the fragmentation level to satisfy a criterion.

In another aspect of the present invention the selecting free space extent step includes selecting the free space extent where the data rate of the disk is fastest.

In another aspect of the present invention the calculating effect step includes recalculating the fragmentation level prior to the file being moved to the free space extent as if the file had already been moved to the free space extent.

In another aspect of the present invention the moving step includes moving if doing so will result in the fragmentation level remaining at or being lower than its current level.

In another aspect of the present invention the moving step includes moving if doing so will result in the fragmentation level reaching a predetermined fragmentation level.

In another aspect of the present invention the method further includes performing any of the steps concurrently with determining a fragmentation level for any file on the disk.

In another aspect of the present invention the method further includes performing any of the steps after the file is accessed or written to.

In another aspect of the present invention the method further includes performing any of the steps where the sum the file's fragmentation level and the length of any free space extents preceding and following each of the file's extents is greatest among a plurality of files on the disk for which such sum is available.

In another aspect of the present invention the method further includes performing any of the steps where the fragmentation level of the file exceeds a predefined threshold.

In another aspect of the present invention the method further includes performing any of the steps a plurality of times for a plurality of files until a termination criterion is satisfied.

In another aspect of the present invention the performing step includes performing until all the files on the disk that are stored in multiple file extents and that are moveable in accordance with the moving step have been moved in accordance with the moving step.

In another aspect of the present invention the performing step includes performing until a predetermined free space or allocated space fragmentation level is reached.

In another aspect of the present invention a system is provided for measuring a file fragmentation factor, the system including means for calculating the square of the length of a file stored on at least one disk, means for calculating the square of the length of each extent of the file, means for calculating the sum of the extent squares, and means for dividing the square of the file length by the sum of the extent squares.

In another aspect of the present invention the length of the file is expressed as the sum of the lengths of each of the extents of the file.

In another aspect of the present invention any of the lengths are expressed in allocation units, where each track of the disk is divided into multiple allocation units, and where each of the extents occupies one or more contiguous allocation units.

In another aspect of the present invention the allocation unit is a sector.

In another aspect of the present invention the means are operative on a plurality of free space extents of the disk that are logically grouped together for use as the file.

In another aspect of the present invention the means are operative on a plurality of allocated space extents of the disk that are logically grouped together for use as the file.

In another aspect of the present invention a system is provided for measuring a file extent distance factor, the system including means for traversing each of the extents of a file stored on at least one disk along a path from the first extent of the file to the last extent of the file where the order of the traversal follows the logical order of the extents in the file, means for calculating the distance from each of the extents to its succeeding extent, and means for calculating the sum of the distances.

In another aspect of the present invention the means for calculating is operative to calculate a number of hops between disk platters where the extent and its succeeding extent lie in different disk platters.

In another aspect of the present invention the means for calculating is operative to calculate a number of hops between cylinders where the extent and its succeeding extent lie in different cylinders.

In another aspect of the present invention the means for calculating is operative to calculate a number of allocation units separating the extent and its succeeding extent, where the separation is calculated in the order in which the allocation units are normally read by a disk read/write head, and where the separation is calculated from a) the allocation unit in the track of the succeeding extent that corresponds positionally to the last allocation unit of the extent, to b) the first allocation unit of the succeeding extent.

In another aspect of the present invention the means for calculating is operative to calculate a number of hops between disks where the extent and its succeeding extent lie in different disks.

In another aspect of the present invention the means are operative on a plurality of free space extents of the disk that are logically grouped together for use as the file.

In another aspect of the present invention the means are operative on a plurality of allocated space extents of the disk that are logically grouped together for use as the file.

In another aspect of the present invention a system is provided for measuring a file fragmentation level, the system including means for calculating the sum of a file's fragmentation factor and its extent distance factor, and means for dividing the sum by the file's length.

In another aspect of the present invention the file's length is expressed in allocation units.

In another aspect of the present invention the system further includes means for weighting any of the factors using a predefined weight.

In another aspect of the present invention the means are operative on a plurality of free space extents of the disk that are logically grouped together for use as the file.

In another aspect of the present invention the means are operative on a plurality of allocated space extents of the disk that are logically grouped together for use as the file.

In another aspect of the present invention a system is provided for defragmentation, the system including means for selecting a file stored as multiple extents on at least one disk, means for selecting a free space extent on the disk whose length most closely matches the length of the file, means for calculating a fragmentation level of the disk from a fragmentation factor and a file extent distance factor of free space extents or allocated space extents of the disk, means for calculating the effect that moving the file to the free space extent would have on the fragmentation level, and means for moving the file to the free space extent provided that doing so causes the fragmentation level to satisfy a criterion.

In another aspect of the present invention the means for selecting the free space extent step is operative to select the free space extent where the data rate of the disk is fastest.

In another aspect of the present invention the means for calculating the effect step is operative to recalculate the fragmentation level prior to the file being moved to the free space extent as if the file had already been moved to the free space extent.

In another aspect of the present invention the means for moving is operative to move the file if doing so will result in the fragmentation level remaining at or being lower than its current level.

In another aspect of the present invention the means for moving is operative to move the file if doing so will result in the fragmentation level reaching a predetermined fragmentation level.

In another aspect of the present invention the means are operative concurrently with determining a fragmentation level for any file on the disk.

In another aspect of the present invention the means are operative responsive to the file being accessed or written to.

In another aspect of the present invention the means are operative where the sum the file's fragmentation level and the length of any free space extents preceding and following each of the file's extents is greatest among a plurality of files on the disk for which such sum is available.

In another aspect of the present invention the means are operative where the fragmentation level of the file exceeds a predefined threshold.

In another aspect of the present invention the means are operative with respect to a plurality of files until a termination criterion is satisfied.

In another aspect of the present invention the means are operative with respect to a plurality of files until all the files on the disk that are stored in multiple file extents and that are moveable in accordance with the moving step have been moved in accordance with the moving step.

In another aspect of the present invention the means are operative with respect to a plurality of files until a predetermined free space or allocated space fragmentation level is reached.

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1A:
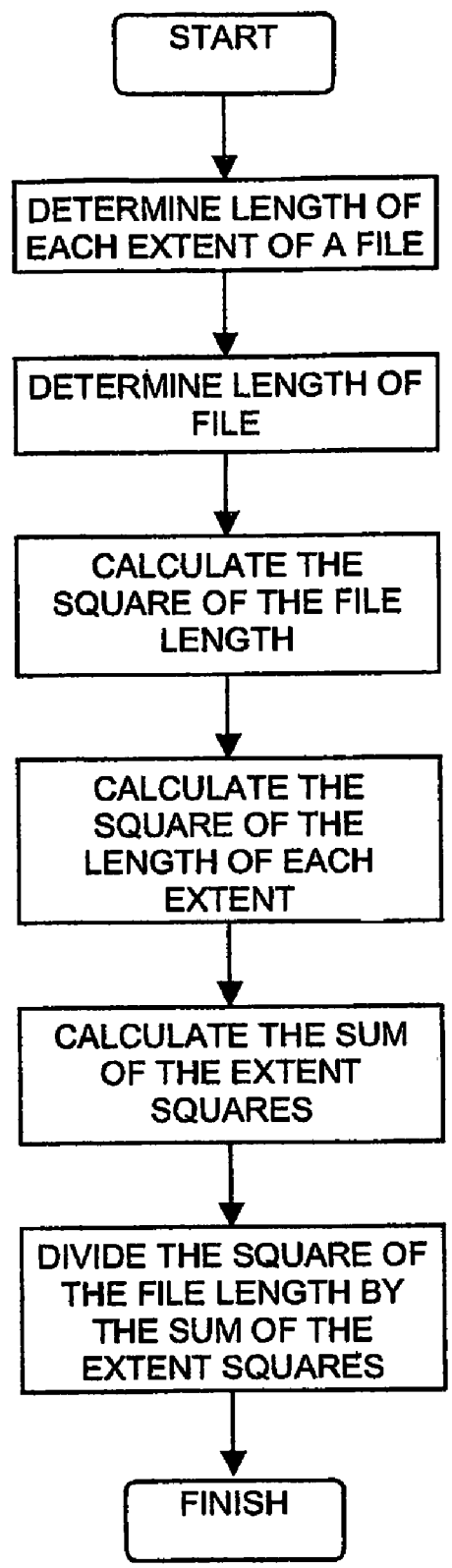
FIG. 1A is a simplified flowchart illustration of a method for measuring a file fragmentation factor, operative in accordance with a preferred embodiment of the present invention.
Figure 1B:
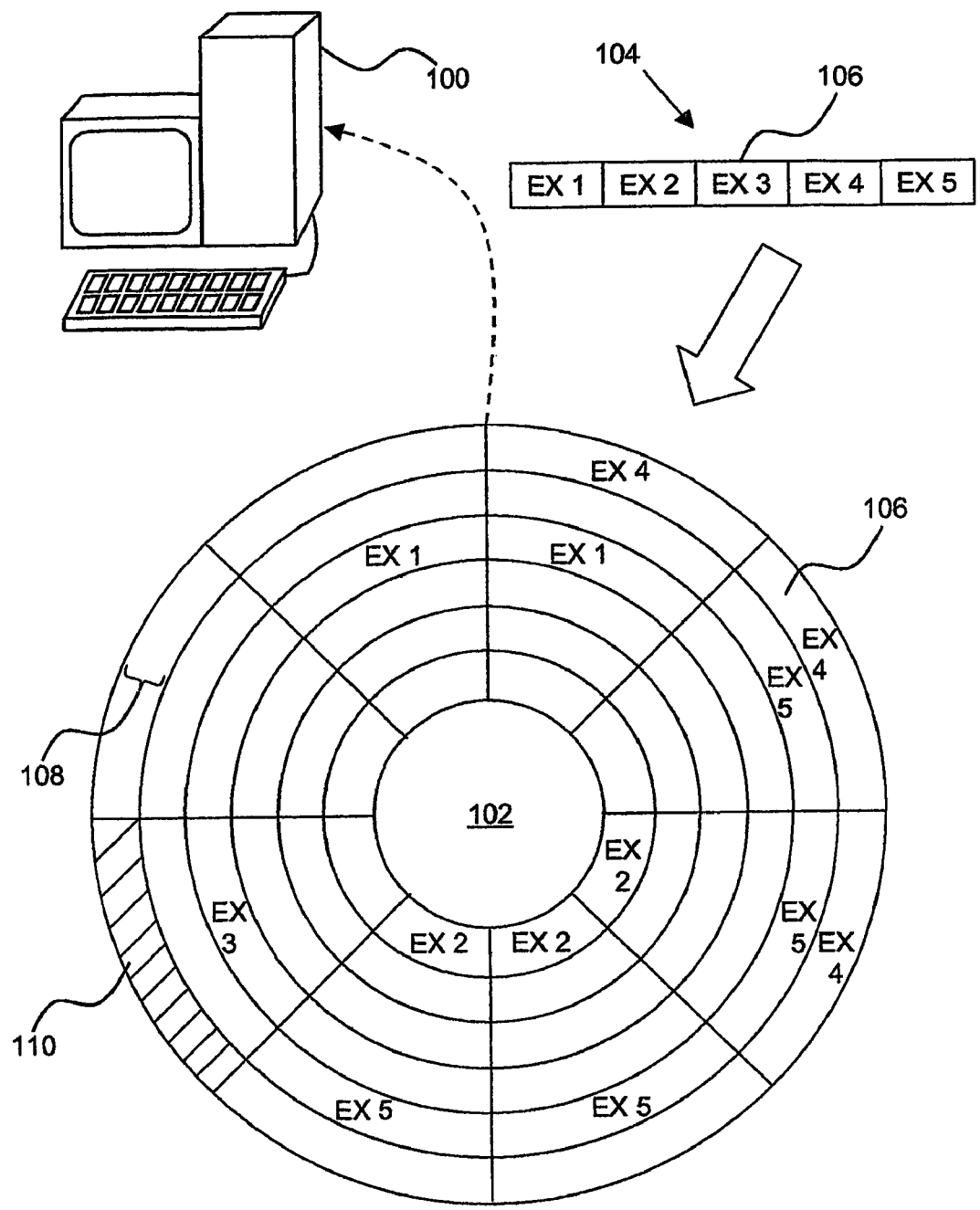
FIG. 1B is a simplified conceptual illustration of file extents, useful in understanding the present invention.

Reference is now made to FIG. 1A, which is a simplified flowchart illustration of a method for measuring a file fragmentation factor, operative in accordance with a preferred embodiment of the present invention, and FIG. 1B, which is a simplified conceptual illustration of file extents, useful in understanding the present invention. In the method of FIG. 1A in view of FIG. 1B, a file fragmentation factor is computed, such as by a by a computer 100, for one or more, and preferably all, files on a disk 102. For a given file, such as a file 104 having multiple extents 106 labeled EX1 through EX5 stored along multiple tracks 108 of disk 102, the length of the file is determined using conventional techniques, and is expressed in allocation units (AUs), such as sectors, where each track 108 is divided into multiple AUs, such as is shown by an AU 110 shown in hatched lines, and where each extent may occupy one or more contiguous AUs. Thus, in the example shown in FIG. 1B, the length of file 104 may be determined by adding the number of AUs occupied by the extents of file 104 on disk 102, as shown in the following table:

TABLE A

| Extent | Number of Occupied AUs |
| --- | --- |
| EX 1 | 2 |
| EX 2 | 3 |
| EX 3 | 1 |
| EX 4 | 3 |
| EX 5 | 4 |
| Total file length: | 13 |

The square of the file length is then calculated, as is the square of the length of each extent, as shown in the following table:

TABLE B

| Extent | Square of Length in AUs |
| --- | --- |
| EX 1 | 4 |
| EX 2 | 9 |
| EX 3 | 1 |
| EX 4 | 9 |
| EX 5 | 16 |
| Square of Total file length: | 169 |

The sum of the extent squares is then calculated. Finally, the square of the file length is divided by the sum of the extent squares to arrive at the fragmentation factor for the file.

Figure 2A:
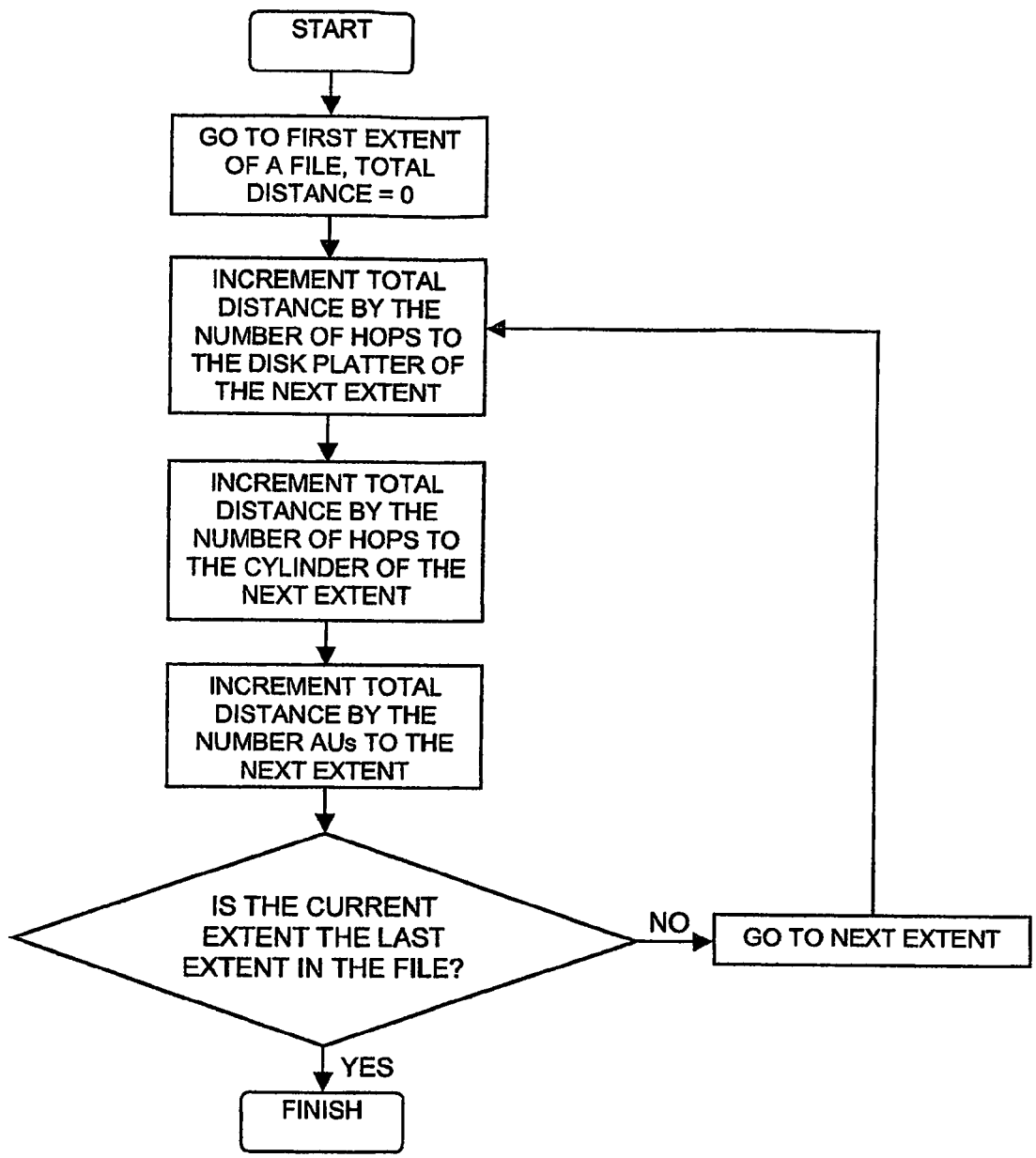
FIG. 2A is a simplified flowchart illustration of a method for measuring a file extent distance factor, operative in accordance with a preferred embodiment of the present invention.
Figure 2B:
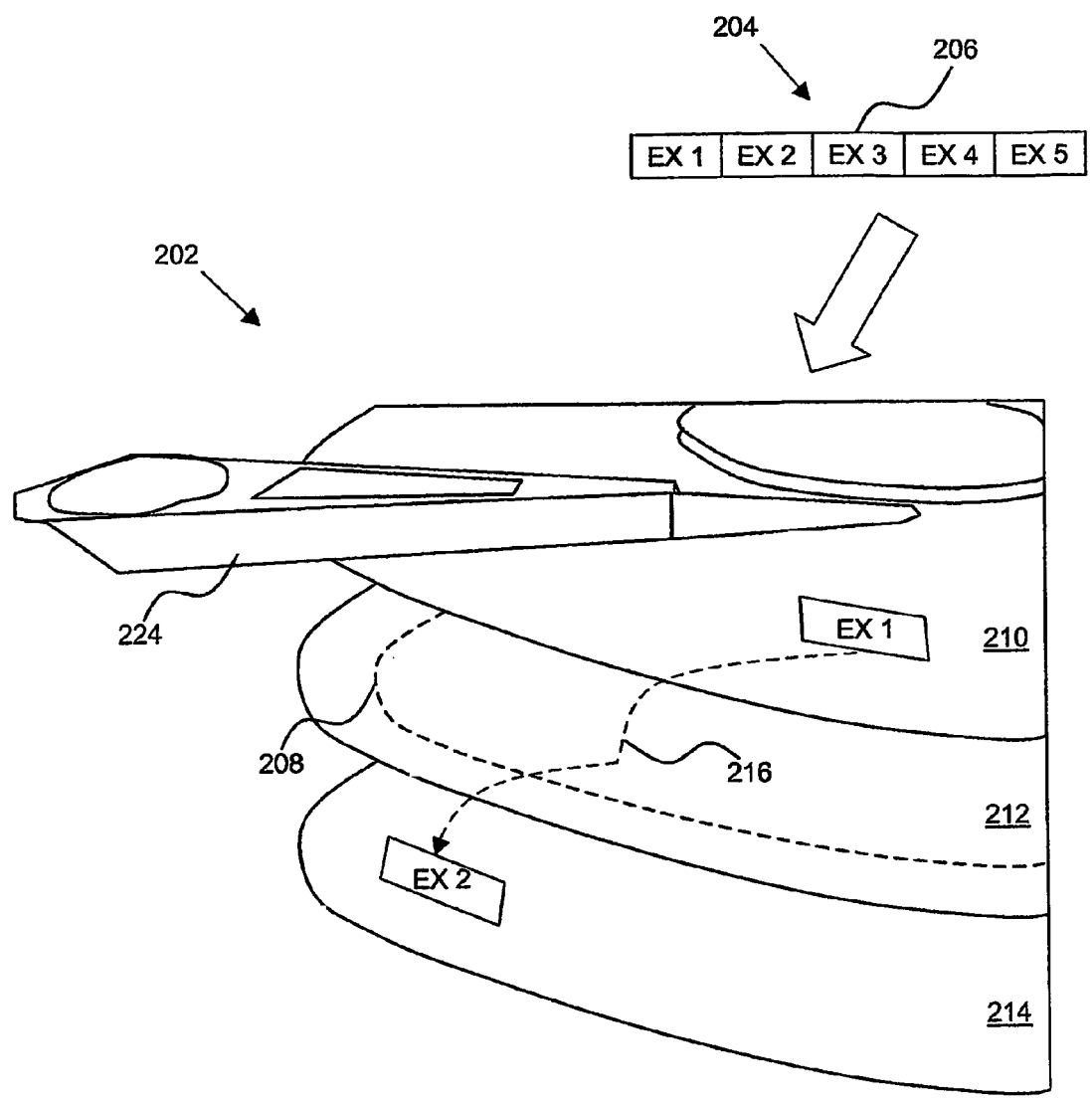
FIGS. 2B-2D are simplified conceptual illustrations of file extent distances, useful in understanding the present invention.
Figure 2C:
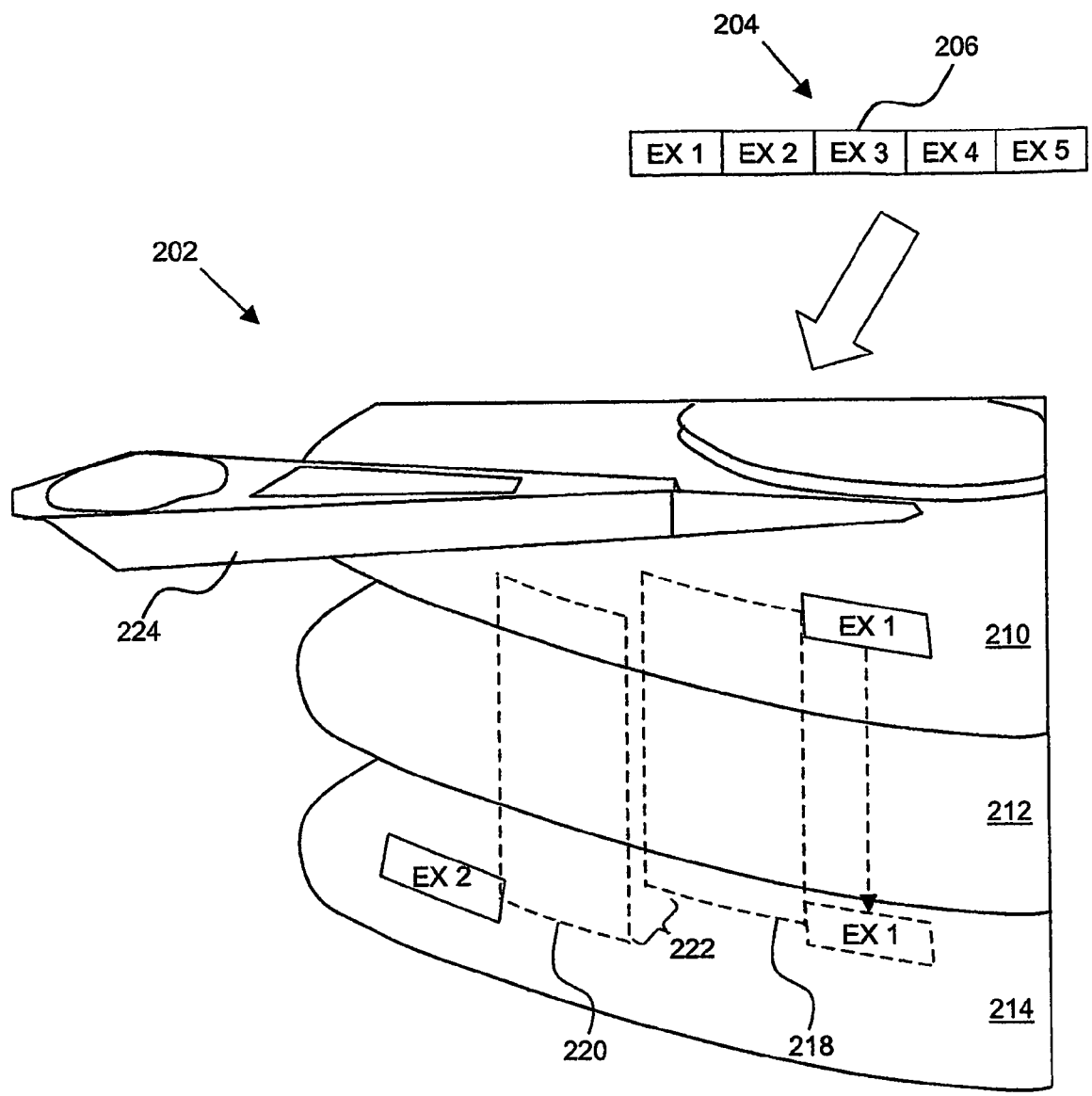
Figure 2D:
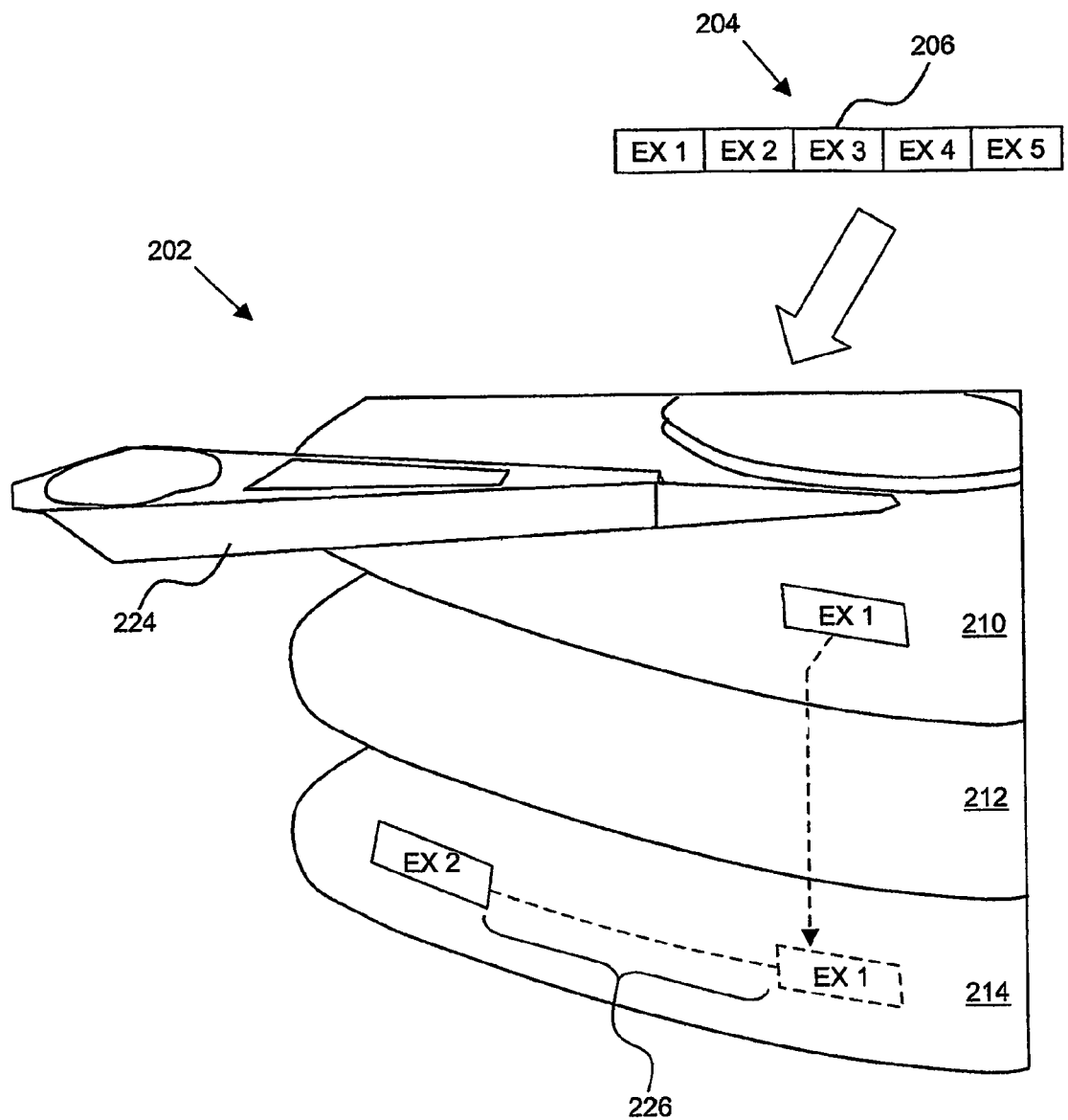

Reference is now made to FIG. 2A, which is a simplified flowchart illustration of a method for measuring a file extent distance factor, operative in accordance with a preferred embodiment of the present invention, and FIGS. 2B-2D, which are simplified conceptual illustrations of file extent distances, useful in understanding the present invention. In the method of FIG. 2A in view of FIGS. 2B-2D, a file extent distance factor is computed, such as by computer 100 (FIG. 1B), for one or more, and preferably all, files on a disk 202. For a given file, such as a file 204 having multiple extents 206 labeled EX1 through EX5 stored along multiple tracks 208 and multiple platters 210, 212, and 214 of disk 202, the distance between the extents of the file is determined by tracing a path from the first extent of file 204 to the last extent of file 204 as follows. Starting from the first extent, and preferably beginning with a staring distance value of zero, the total distance is incremented by the number of hops from the disk platter in which the current extent lies, to the disk platter in which the next extent, as indicated by its logical order in the file, lies. Thus, in FIG. 2B, if EX1 lies in platter 210 and EX2 lies in platter 214, the total distance would be incremented by 2 as shown by arrow 216. The total distance is also incremented by the number of hops from the cylinder in which the current extent lies, to the cylinder in which the next extent lies, where a cylinder is represented by multiple tracks of the same relative position on multiple platters. Thus, in FIG. 2C, if EX1 lies along a cylinder 218 and EX2 lies along a cylinder 220, and the cylinders represent adjacent tracks, the total distance would be incremented by 1 as shown by arrow 222. The total distance is also incremented by the number AUs (in the order in which AUs are normally read by a disk read/write head 224) from the AU in the track of next extent that corresponds positionally to the last AU of the current extent, to the first AU of the next extent. Thus, in FIG. 2D, if EX1 were placed on the track along which EX2 lies at the same relative position where EX1 lies in its own track, and the distance between the last AU of EX1 and the first AU of EX2 is 10 AUs, the total distance would be incremented by 10 as shown by arrow 226.

The above process is then performed to measure the platter hops, cylinder hops, and AU hops from EX2 to EX3 and so on until the number of platter hops, cylinder hops, and AU hops are measured between all the extents of a file. The total distance represents the file extent distance factor for the measured file. It will be appreciated that where the extents of a file are located on several different disks, such as in a RAID storage system, the total distance may be incremented by the number of hops from the disk in which the current extent lies, to the disk in which the next extent lies.

Figure 3:
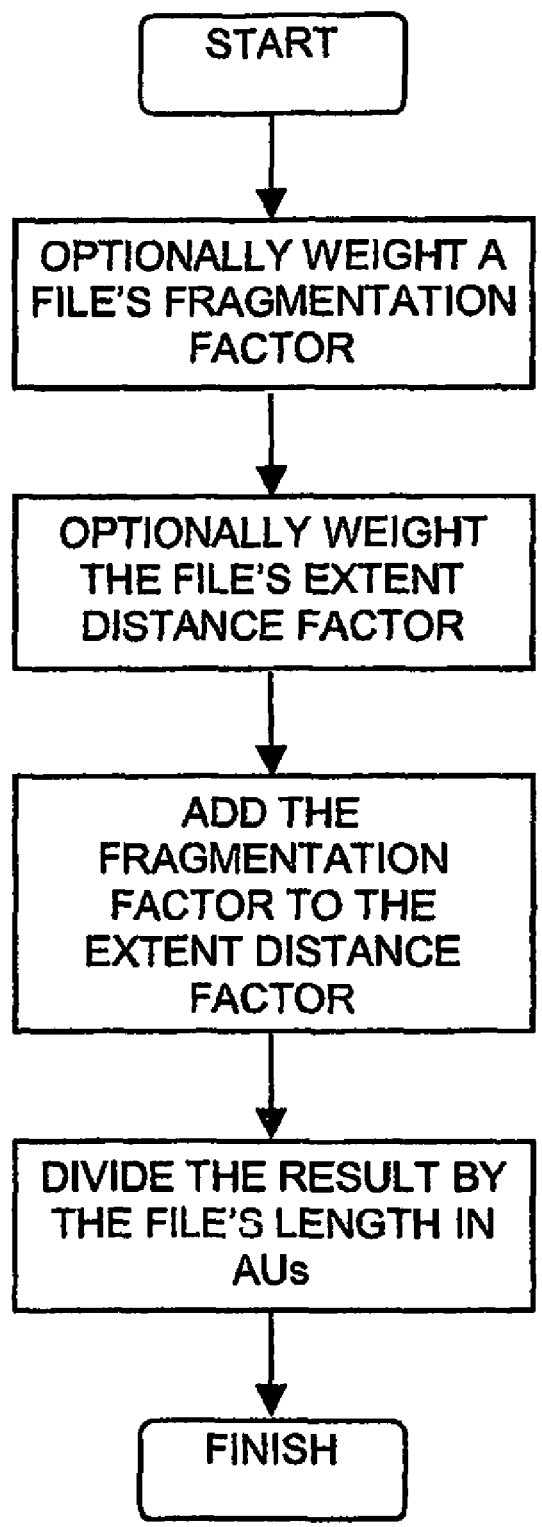
FIG. 3 is a simplified flowchart illustration of a method for measuring a file fragmentation level, operative in accordance with a preferred embodiment of the present invention.

Reference is now made to FIG. 3, which is a simplified flowchart illustration of a method for measuring a file fragmentation level, operative in accordance with a preferred embodiment of the present invention. In the method of FIG. 3, a file fragmentation level is computed for one or more, and preferably all, files on a disk by adding the file's fragmentation factor to its extent distance factor, either of which may be weighted using a predefined weight determined using any weighting technique, and dividing the result by the file's length in AUs.

Figure 4:
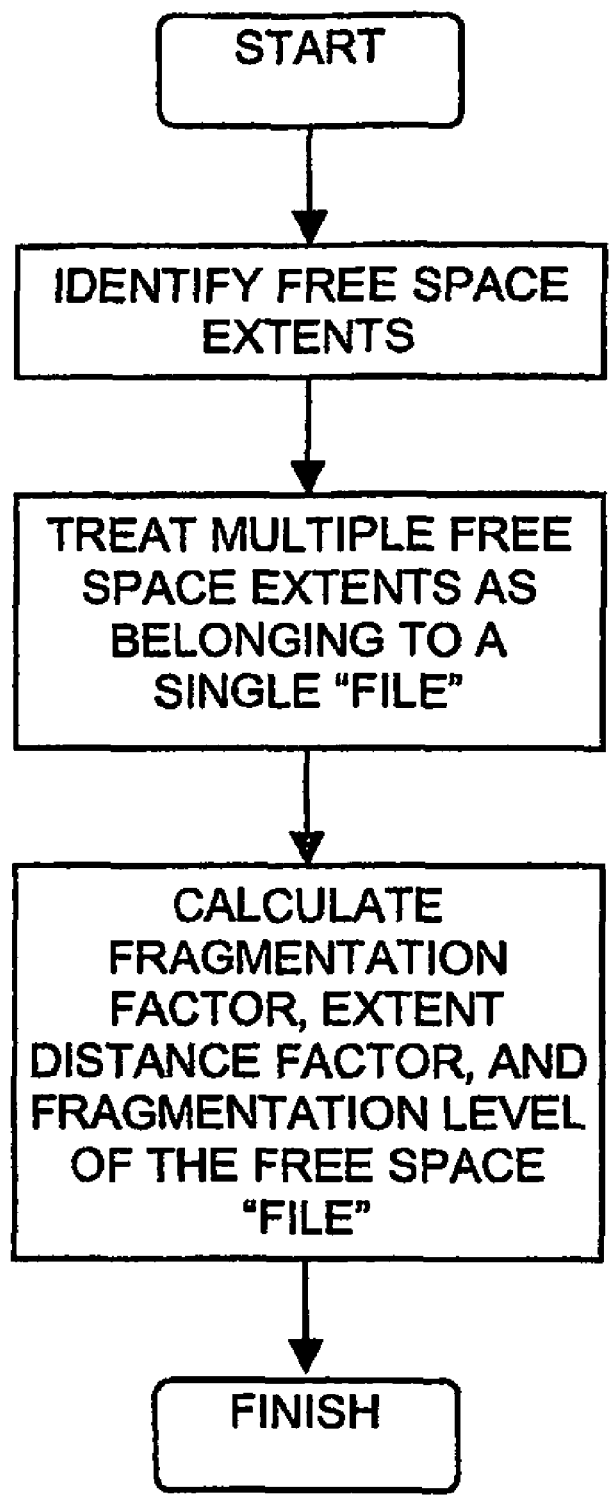
FIG. 4 is a simplified flowchart illustration of a method for measuring a fragmentation level of free space on a disk, operative in accordance with a preferred embodiment of the present invention.

Reference is now made to FIG. 4, which is a simplified flowchart illustration of a method for measuring a fragmentation level of free space on a disk, operative in accordance with a preferred embodiment of the present invention. In the method of FIG. 4, the free space extents of a disk, being contiguous free space between consecutive file extents of the same or different files, are identified using any conventional technique. For example, an allocation unit table may be built where each row of the table represents an allocation unit on a disk, such as a sector, ordered by allocation unit Where a file extent populates an AU, the row in the allocation unit table corresponding to the AU is marked as occupied, preferably including identifiers for the file name and the file extent. In this manner, all the AUs on a disk may either be marked as occupied by a file extent, or left unmarked. Runs of unmarked AU rows in the allocation unit table between preceding and following marked rows may thus define a free space extent. All free space extents may then be treated as belonging to a single "file" having multiple extents of contiguous free space, although any free space extent between the last AU allocated to a file and the end of the disk may be ignored and not included in the free space "file". The fragmentation factor, extent distance factor, and fragmentation level of the free space "file" may then be determined as described above for actual files with reference to FIGS. 1A-3. The location of free space extents may be maintained in a table, as may their location relative to the file extents which they neighbor.

Figure 5:
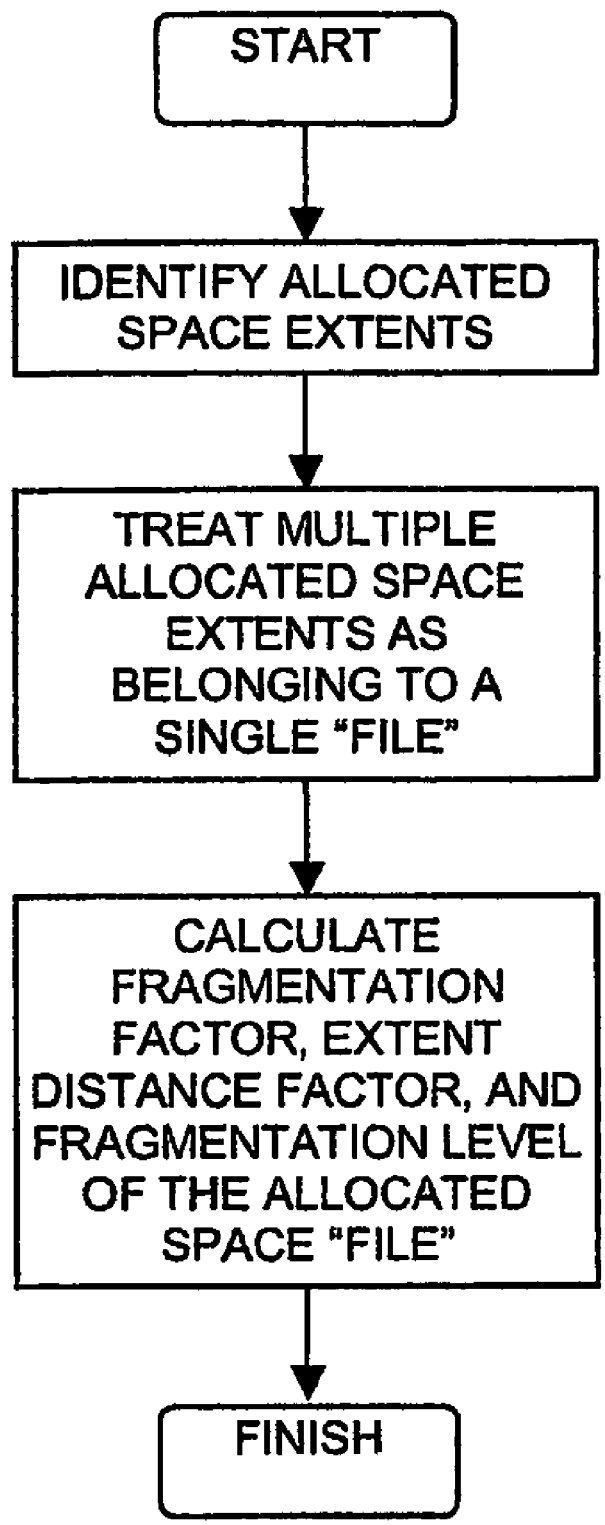
FIG. 5 is a simplified flowchart illustration of a method for measuring a fragmentation level of allocated space on a disk, operative in accordance with a preferred embodiment of the present invention.

Reference is now made to FIG. 5, which is a simplified flowchart illustration of a method for measuring a fragmentation level of allocated space on a disk, operative in accordance with a preferred embodiment of the present invention. In the method of FIG. 5, the allocated space extents of a disk, being the runs of contiguous allocated-to-files space between free space extents, may be treated as belonging to a single "file" having multiple extents of contiguous allocated space. The fragmentation factor, extent distance factor, and fragmentation level of the allocated space "file" may then be determined as described above for actual files with reference to FIGS. 1A-3.

Figure 6:
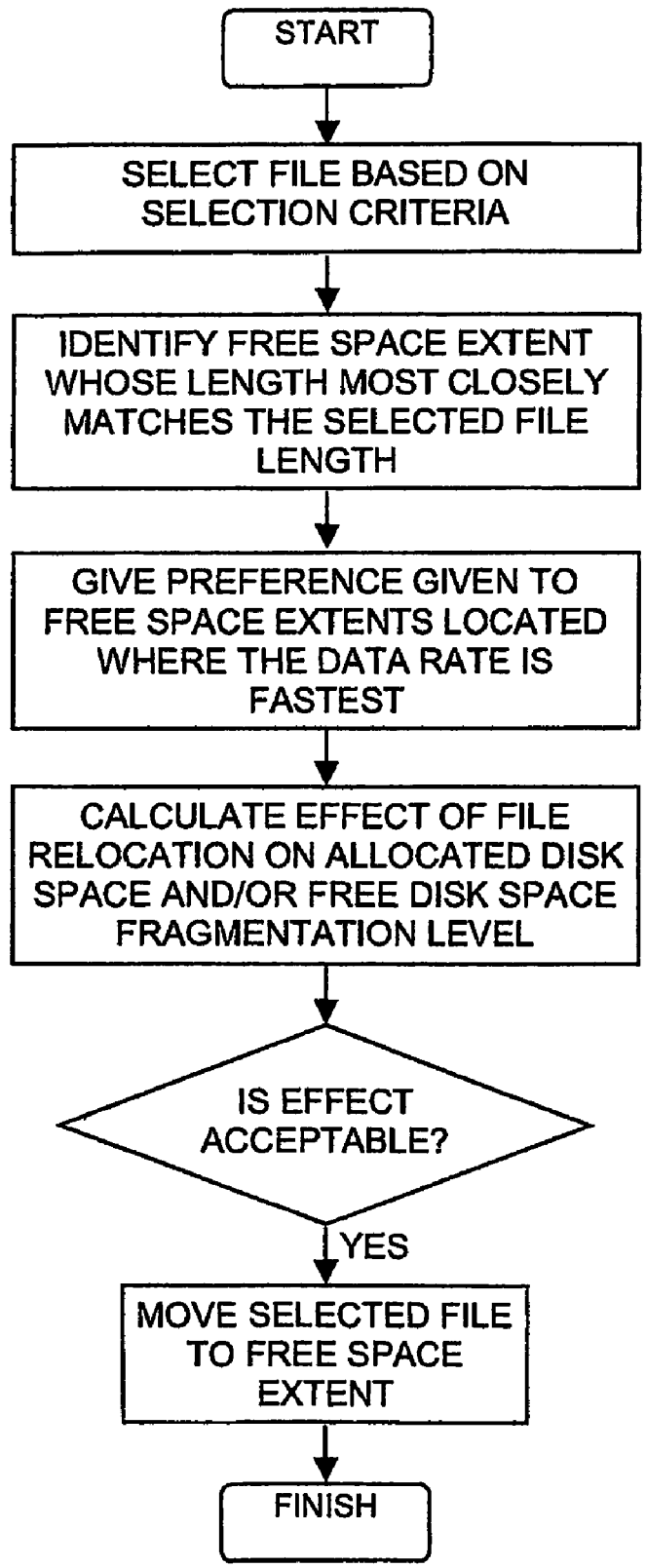
FIG. 6 is a simplified flowchart illustration of a method for defragmentation, operative in accordance with a preferred embodiment of the present invention.

Reference is now made to FIG. 6, which is a simplified flowchart illustration of a method for defragmentation, operative in accordance with a preferred embodiment of the present invention. In the method of FIG. 6, a file on a disk is selected, where the file is stored as multiple extents. A free space extent on the disk is then sought whose length most closely matches the length of the selected file, with preference given to free space extents located where the data rate is fastest, such as those that are closest to the edge of the disk. Thus, if two free space extents of equal length most closely match a file 20 AUs long, the free space extent located where the data rate is fastest is selected. Preferably prior to the selected file being moved to the selected free space extent, the fragmentation level of the allocated disk space and/or the free disk space is recalculated as described above, as if the selected file had already been moved to the selected free space extent The file may be moved to the selected free space extent provided that doing so will not result in an allocated disk space fragmentation level and/or a free disk space fragmentation level that is higher than the current level. Alternatively, the file may be moved to the selected free space extent provided that doing so will result in an allocated disk space fragmentation level and/or a free disk space fragmentation level that is at, or lower than, the current level. Alternatively, the file may be moved to the selected free space extent provided that a predetermined free space fragmentation level is reached.

It will be appreciated that the method of FIG. 6 may be performed concurrently with the methods of 1A-4, where file fragmentation levels and free space extents have not yet been determined for all files and free space on a disk, but rather only for a subset thereof. Processing may begin with any file at any time, such as based on any of the following criteria:

after a file is accessed or written to;

where the sum of a file's fragmentation level, as determined in accordance with FIG. 3 above, and the length of any free space extents preceding and following each of the file's extents, such as may be determined using the allocation unit table of FIG. 4 above, is greatest among all files on a disk, or greatest among all files on the disk for which such sum is available; or if the fragmentation level of a file exceeds a predefined threshold, such as may be a preset value or determined as a function of the fragmentation level of the allocated disk space and/or the free disk space.

Processing preferably continues with the next candidate file being selected for possible relocation until all files that meet the moving criteria have been relocated in this manner or until a predetermined free space or allocated space fragmentation level is reached.

It will thus be appreciated that the methods of the present invention provide quantitative and qualitative measurements of fragmentation, both at the level of the individual file, as well as for an entire disk in terms of allocated space fragmentation and free space fragmentation, and that such measurements provide a basis for the defragmentation methods described herein.

It is appreciated that one or more of the steps of any of the methods described herein may be omitted or carried out in a different order than that shown, without departing from the true spirit and scope of the invention. For example, aspects of the present invention may be carried out simultaneously, such as on different areas of the same disk.

While the methods and apparatus disclosed herein may or may not have been described with reference to specific computer hardware or software, it is appreciated that the methods and apparatus described herein may be readily implemented in computer hardware or software using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for defragmentation, the system comprising:
   means for selecting a file stored as multiple extents on at least one storage device;
   means for selecting a free space extent on said storage device whose length most closely matches the length of said file;
   means for calculating a fragmentation level of said storage device from a fragmentation factor of either of free space extents and allocated space extents of said storage device;
   means for calculating the effect that moving said file to said free space extent would have on said fragmentation level; and
   means for moving said file to said free space extent only if said calculated effect indicates that moving said file to said free space extent will not increase said fragmentation level,
   wherein said means are embodied in at least one of
   a) computer hardware, and
   b) computer software embodied in a computer-readable storage medium.

2. The system according to claim 1 wherein said means for selecting said free space extent step is configured to select said free space extent where the data rate of said storage device is fastest.

3. The system according to claim 1 wherein said means for calculating said effect step is configured to recalculate said fragmentation level prior to said file being moved to said free space extent as if said file had already been moved to said free space extent.

4. The system according to claim 1 wherein said means are configured to operate where a sum of said file's fragmentation level and the length of any free space extents preceding and following each of said file's extents is greatest among a plurality of files on said storage device for which said sum is available.

5. The system according to claim 1 wherein said means are configured to operate where the fragmentation level of said file exceeds a predefined threshold.

6. The system according to claim 1 and further comprising means for measuring a file fragmentation factor comprising:
   means for calculating a square of a value representing the length of a file stored on at least one storage device;
   means for calculating a square of a value representing of the length of each extent of said file;
   means for calculating the sum of said extent squares; and
   means for dividing the square of said file length by the sum of said extent squares.

7. The system according to claim 6 wherein the length of said file is expressed as the sum of the lengths of each of said extents of said file.

8. The system according to claim 6 wherein said means are configured to operate on a plurality of free space extents of said storage device that are logically grouped together for use as said file.

9. The system according to claim 6 wherein said means are configured to operate on a plurality of allocated space extents of said storage device that are logically grouped together for use as said file.

10. A method for defragmentation, the method comprising:
    selecting a file stored as multiple extents on at least one storage device;

selecting a free space extent on said storage device whose length most closely matches the length of said file;

calculating a fragmentation level of said storage device from a fragmentation factor of either of free space extents and allocated space extents of said storage device;

calculating the effect that moving said file to said free space extent would have on said fragmentation level; and moving said file to said free space extent only if said calculated effect indicates that moving said file to said free space extent will not increase said fragmentation level.

11. The method according to claim 10 wherein said selecting free space extent step comprises selecting said free space extent where the data rate of said storage device is fastest.

12. The method according to claim 10 wherein said calculating effect step comprises recalculating said fragmentation level prior to said file being moved to said free space extent as if said file had already been moved to said free space extent.

13. The method according to claim 10 and further comprising performing any of said steps of selecting, calculating, and moving where a sum of said file's fragmentation level and the length of any free space extents preceding and following each of said file's extents is greatest among a plurality of files on said storage device for which said sum is available.

14. The method according to claim 10 and further comprising performing any of said steps of selecting, calculating, and moving where the fragmentation level of said file exceeds a predefined threshold.

15. The method according to claim 10 and further comprising:

calculating a square of a value representing of the length of a file stored on at least one storage device;

calculating a square of a value representing of the length of each extent of said file;

calculating the sum of said extent squares; and dividing the square of said file length by the sum of said extent squares, thereby calculating said fragmentation factor.

16. The method according to claim 15 and further comprising determining the length of said file as the sum of the lengths of each of said extents of said file.

17. The method according to claim 15 and further comprising performing any of said steps of selecting, calculating, and moving on a plurality of free space extents of said storage device that are logically grouped together for use as said file.

18. The method according to claim 15 and further comprising performing any of said steps of selecting, calculating, and moving on a plurality of allocated space extents of said storage device that are logically grouped together for use as said file.

* * * * *